United States Patent
Steiner et al.

(10) Patent No.: US 6,872,772 B2
(45) Date of Patent: *Mar. 29, 2005

(54) PNEUMATIC TIRE HAVING A COMPONENT CONTAINING HIGH TRANS STYRENE-BUTADIENE RUBBER

(75) Inventors: Pascal Patrick Steiner, Diekirch (LU); Tom Dominique Linster, Gilsdorf (LU); Marc Weydert, Strassen (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/815,152

(22) Filed: Mar. 31, 2004

(65) Prior Publication Data

US 2004/0177907 A1 Sep. 16, 2004

Related U.S. Application Data

(63) Continuation-in-part of application No. 10/313,779, filed on Dec. 5, 2002.

(51) Int. Cl.$^7$ ................................. B60C 1/00
(52) U.S. Cl. .................... 524/526; 152/525; 525/241
(58) Field of Search ................ 152/525; 524/526; 525/241

(56) References Cited

U.S. PATENT DOCUMENTS

| | | | |
|---|---|---|---|
| 3,992,561 A | 11/1976 | Hargis et al. | 526/181 |
| 4,020,115 A | 4/1977 | Hargis et al. | 260/632 |
| 4,033,900 A | 7/1977 | Hargis et al. | 252/431 |
| 4,048,427 A | 9/1977 | Hargis et al. | 526/337 |
| 4,260,519 A | 4/1981 | Aggarwal et al. | 252/431 |
| 4,260,712 A | 4/1981 | Aggarwal et al. | 526/181 |
| 4,297,240 A | 10/1981 | Bingham et al. | 252/431 |
| 4,302,568 A | 11/1981 | Bingham et al. | 526/187 |
| 4,307,218 A | 12/1981 | Bingham et al. | 526/340 |
| 4,355,156 A | 10/1982 | Bingham et al. | 528/413 |
| 4,503,204 A | 3/1985 | Bingham et al. | 526/187 |
| 4,616,065 A | 10/1986 | Hargis et al. | 525/99 |
| 4,669,518 A | 6/1987 | Hargis et al. | 152/209 |
| 4,670,502 A | 6/1987 | Hargis et al. | 524/505 |
| 5,042,546 A | 8/1991 | Forney et al. | 152/454 |
| 5,100,965 A | 3/1992 | Hsu et al. | 525/249 |
| 5,435,369 A | 7/1995 | Yap et al. | 152/454 |
| 5,616,195 A | 4/1997 | Marquet et al. | 152/209 R |
| 5,753,579 A | 5/1998 | Jalics et al. | 502/153 |
| 5,834,573 A | 11/1998 | Castner | 526/142 |
| 5,902,856 A | 5/1999 | Suzuki et al. | 525/237 |
| 6,013,737 A | 1/2000 | Takagishi et al. | 525/332.7 |
| 6,015,850 A | 1/2000 | Nakamura et al. | 524/188 |
| 6,046,266 A | 4/2000 | Sandstrom et al. | 524/492 |
| 6,057,397 A | 5/2000 | Takagishi et al. | 524/492 |
| 6,103,842 A | 8/2000 | Halasa et al. | 526/175 |
| 6,111,045 A | 8/2000 | Takagishi et al. | 526/338 |
| 6,114,432 A | 9/2000 | Takagishi et al. | 524/494 |
| 6,147,178 A | 11/2000 | Nakamura et al. | 526/340 |
| 6,211,321 B1 | 4/2001 | Takagishi et al. | 526/335 |
| 6,310,152 B1 | 10/2001 | Castner | 526/142 |
| 6,333,375 B1 | 12/2001 | Nakamura et al. | 524/394 |
| 6,619,357 B1 | 9/2003 | Gillard et al. | 152/531 |
| 6,627,715 B2 | 9/2003 | Halasa et al. | 526/177 |

*Primary Examiner*—Peter D. Mulcahy
(74) *Attorney, Agent, or Firm*—John D. DeLong

(57) ABSTRACT

The invention is directed to a radial medium truck tire having a tread component comprising a vulcanizable rubber composition comprising, based on 100 parts by weight of elastomer (phr), from about 5 to about 30 phr of high trans random SBR; from about 70 to about 95 phr of a combination of high cis-1,4-polybutadiene rubber (BR) and cis 1,4-polyisoprene natural rubber (IR) in a IR/BR weight ratio of from about 1 to about 3; from about 20 to about 40 phr of carbon black; and from about 15 to about 35 phr of precipitated silica.

17 Claims, No Drawings

PNEUMATIC TIRE HAVING A COMPONENT CONTAINING HIGH TRANS STYRENE-BUTADIENE RUBBER

CROSS REFERENCE TO RELATED APPLICATIONS

This application is a continuation in part of co-pending Ser. No. 10/313,779, filed Dec. 5, 2002, the contents of which are fully incorporated by reference herein.

BACKGROUND OF THE INVENTION

It is highly desirable for tires to have good wet skid resistance, low rolling resistance, and good wear characteristics. It has traditionally been very difficult to improve a tire's wear characteristics without sacrificing its wet skid resistance and traction characteristics. These properties depend, to a great extent, on the dynamic viscoelastic properties of the rubbers utilized in making the tire.

In order to reduce the rolling resistance and to improve the treadwear characteristics of tires, rubbers having a high rebound have traditionally been utilized in making tire tread rubber compounds. On the other hand, in order to increase the wet skid resistance of a tire, rubbers which undergo a large energy loss have generally been utilized in the tire's tread. In order to balance these two viscoelastically inconsistent properties, mixtures of various types of synthetic and natural rubber are normally utilized in tire treads. For instance, various mixtures of styrene-butadiene rubber and polybutadiene rubber are commonly used as a rubbery material for automobile tire treads.

U.S. Pat. No. 6,103,842 and U.S. application Ser. No. 10/124,006, now U.S. Pat. No. 6,627,715, disclose processes and catalyst systems for the copolymerization of 1,3-butadiene monomer and styrene monomer into a styrene-butadiene copolymer having a high trans-1,4-polybutadiene content and having a random distribution of repeat units which are derived from styrene. It is also therein disclosed that styrene-butadiene rubber made utilizing the catalyst system and techniques therein may be used in the preparation of tire tread rubber compounds which exhibit improved wear characteristics. What is not disclosed is that superior wear characteristics may be obtained using a low styrene content in the high trans random SBR.

SUMMARY OF THE INVENTION

The current invention is directed to a pneumatic tire having at least one component comprising a high trans solution styrene-butadiene rubber (HTSBR) with a random distribution of repeat units which are derived from styrene. The invention is based on the highly surprising and unexpected discovery that a desirable balance of properties may be realized by using a HTSBR with a low styrene content.

It is then an object of the present invention to provide a pneumatic tire having at least one component comprising a vulcanizable rubber composition, wherein the vulcanizable rubber composition comprises, based on 100 parts by weight of elastomer (phr), from about 5 to 30 phr of high trans random SBR, and from about 70 to about 95 phr of at least one additional elastomer, wherein the high trans random SBR comprises from about 3 to about 30 percent by weight of styrene.

It is another object of the present invention to provide a radial medium truck tire having a tread component comprising a vulcanizable rubber composition comprising, based on 100 parts by weight of elastomer (phr), from about 5 to about 30 phr of high trans random SBR; from about 70 to about 95 phr of a combination of high cis-1,4-polybutadiene rubber (BR) and cis 1,4-polyisoprene natural rubber (IR) in a IR/BR weight ratio of from about 1 to about 3; from about 20 to about 40 phr of carbon black; and from about 15 to about 35 phr of precipitated silica.

DESCRIPTION OF THE INVENTION

The pneumatic tire of the present invention has at least one component comprising a high trans solution styrene-butadiene rubber HTSBR. By HTSBR, it is meant an SBR produced by a solution method and having a percentage of trans-1,4-butadiene conformation in the polybutadiene segments of the polymer of greater than 60 percent by weight. Alternatively, suitable HTSBR may have a percentage of trans-1,4-butadiene conformation in the polybutadiene segments of the polymer of greater than 70 percent by weight. Suitable HTSBR may contain from about 3 to about 30 percent by weight of styrene. Alternatively, suitable HTSBR may contain from about 3 to about 20 percent by weight of styrene. Alternatively, suitable HTSBR may contain from about 3 to about 10 percent by weight of styrene.

Suitable HTSBR may be made by any of the suitable solution polymerization methods as are known in the art. In one embodiment, suitable HTSBR may be made using the methods of U.S. Pat. No. 6,103,842. In another embodiment, suitable HTSBR may be made using the methods of U.S. application Ser. No. 10/124,006, now U.S. Pat. No. 6,627,715. Styrene-butadiene rubbers so made may contain from about 2 weight percent to about 50 weight percent styrene and from about 50 weight percent to about 98 weight percent 1,3-butadiene. However, in some cases, the amount of styrene included will be as low as about 1 weight percent. In one embodiment of the present invention, suitable styrene-butadiene rubber so made will contain from about 3 weight percent to about 30 weight percent styrene and from about 70 weight percent to about 97 weight percent 1,3-butadiene. In another embodiment, suitable styrene-butadiene rubber will contain from about 3 weight percent to about 20 weight percent styrene and from about 80 weight percent to about 97 weight percent 1,3-butadiene. In another embodiment, suitable styrene-butadiene rubber will contain from about 3 weight percent to about 10 weight percent styrene, and from about 90 weight percent to about 97 weight percent 1,3-butadiene. These styrene-butadiene rubbers typically have a melting point which is within the range of about below 44° C. Higher styrene content HTSBR may exhibit no melting point.

The styrene-butadiene rubber will typically have a glass transition temperature in a range of from about −55° C. to about −85° C.; alternatively from about −65° C. to about −85° C.

In suitable styrene-butadiene rubbers containing less than about 30 weight percent bound styrene, the distribution of repeat units derived from styrene and butadiene is essentially random. The term "random" as used herein means that less than 10 percent of the total quantity of repeat units derived from styrene are in blocks containing more than five styrene repeat units. In other words, more than 90 percent of the repeat units derived from styrene are in blocks containing five or fewer repeat units. About 20% of the repeat units derived from styrene will be in blocks containing only one styrene repeat unit. Such blocks containing one styrene repeat unit are bound on both sides by repeat units which are derived from 1,3-butadiene.

In suitable styrene-butadiene rubbers containing less than about 20 weight percent bound styrene, less than 4 percent of the total quantity of repeat units derived from styrene are in blocks containing five or more styrene repeat units. In other words, more than 96 percent of the repeat units derived from styrene are in blocks containing less than five repeat units. In such styrene-butadiene rubbers, over 25 percent of repeat units derived from styrene will be in blocks containing only one styrene repeat unit, over 60 percent of the repeat units derived from styrene will be in blocks containing less than 3 repeat units, and over 90 percent of the repeat units derived from styrene will be in blocks containing 4 or fewer repeat units.

In suitable styrene-butadiene rubbers containing less than about 10 weight percent bound styrene, less than 1 percent of the total quantity of repeat units derived from styrene are in blocks containing 5 or more styrene repeat units. In other words, more than 99 percent of the repeat units derived from styrene are in blocks containing 4 or less repeat units. In such styrene-butadiene rubbers, at least about 50 percent of repeat units derived from styrene will be in blocks containing only one styrene repeat unit and over about 85 percent of the repeat units derived from styrene will be in blocks containing less than 3 repeat units.

Suitable styrene-butadiene copolymers also have a consistent composition throughout their polymer chains. In other words, the styrene content of the polymer will be the same from the beginning to the end of the polymer chain. No segments of at least 100 repeat units within the polymer will have a styrene content which differs from the total styrene content of the polymer by more than 10 percent. Such styrene-butadiene copolymers will typically contain no segments having a length of at least 100 repeat units which have a styrene content which differs from the total styrene content of the polymer by more than about 5 percent.

In the broadest embodiment, suitable HTSBR may be made by any of the suitable solution polymerization methods as are known in the art. In one embodiment, suitable HTSBR may be produced using a process as taught in U.S. application Ser. No. 10/124,006, now U.S. Pat. No. 6,627,715, fully incorporated herein by reference, that comprises copolymerizing styrene and 1,3-butadiene in an organic solvent in the presence of a catalyst system that is comprised of (A) an organolithium compound;

(B) a group IIa metal salt selected from the group consisting of group IIa metal salts of amino glycols and group IIa metal salts of glycol ethers; and (C) an organometallic compound selected from the group consisting of organoaluminum compounds and organomagnesium compounds. In another embodiment, as disclosed in U.S. Pat. No. 6,627,715 the HTSBR may be produced by a process that comprises polymerizing styrene and 1,3-butadiene in an organic solvent at a temperature that is within the range of about 40° C. to about 120° C. in the presence of a catalyst system that is comprised of (a) an organolithium compound, (b) a group IIa metal salt of an amino glycol, and (c) an organometallic compound selected from the group consisting of organoaluminum compounds containing less than 13 carbon atoms and organomagnesium compounds.

In another embodiment, suitable HTSBR may be produced using a process as taught in U.S. Pat. No. 6,103,842, fully incorporated herein by reference, that comprises copolymerizing styrene and 1,3-butadiene under isothermal conditions in an organic solvent in the presence of a catalyst system which consists essentially of (A) an organolithium compound;

(B) a barium alkoxide; and (C) a lithium alkoxide.

In one embodiment, the pneumatic tire of the present invention may include a component comprising between about 5 and about 30 parts by weight of HTSBR. The component may also include between 70 and up to 95 parts by weight of other elastomers as are known in the art, to make up a total 100 parts by weight of elastomer. In another embodiment, the pneumatic tire of the present invention may include a component comprising between about 10 and about 20 parts by weight of HTSBR. The component may also include between about 80 and about 90 parts by weight of other elastomers as are known in the art, to make up a total 100 parts by weight of elastomer.

Other elastomers that may be used along with the HTSBR may include various general purpose elastomers as are known in the art. The phrase "rubber or elastomer containing olefinic unsaturation" is intended to include both natural rubber and its various raw and reclaim forms as well as various synthetic rubbers. In the description of this invention, the terms "rubber" and "elastomer" may be used interchangeably, unless otherwise prescribed. The terms "rubber composition", "compounded rubber" and "rubber compound" are used interchangeably to refer to rubber which has been blended or mixed with various ingredients and materials, and such terms are well known to those having skill in the rubber mixing or rubber compounding art. Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-1,4-polybutadiene), polyisoprene (including cis-1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include a carboxylated rubber, silicon-coupled and tin-coupled star-branched polymers. The preferred rubber or elastomers are polybutadiene, SBR, and natural rubber.

In one aspect, the rubber to be combined with the HTSBR is preferably one or more diene-based rubbers. For example, one or more rubbers is preferred such as cis 1,4-polyisoprene rubber (natural or synthetic, although natural is preferred), 3,4-polyisoprene rubber, emulsion and solution polymerization derived styrene/isoprene/butadiene rubber, emulsion and solution polymerization derived styrene/butadiene rubbers, emulsion and solution polymerization derived isoprene/butadiene rubber, emulsion and solution polymerization derived styrene/isoprene rubber, cis 1,4- polybutadiene rubbers and emulsion polymerization prepared butadiene/acrylonitrile copolymers.

In one alternative embodiment, the rubber to be combined with the HTSBR is solution polymerized styrene/butadiene rubber. In one embodiment, from about 70 to about 95 phr of SSBR may be combined with the HTSBR.

In one alternative embodiment, the rubber to be combined with the HTSBR is solution polymerized styrene/butadiene rubber and cis 1,4-polybutadiene rubber.

In another embodiment, the rubber to be combined with the HTSBR is, per 100 parts by weight of additional elastomer, from about 65 to about 90 parts by weight of solution polymerized styrene/butadiene rubber, and from about 35 to about 10 parts by weight of cis 1,4-polybutadiene rubber.

In another embodiment, the combination of HTSBR with the additional elastomer is done such that the glass transition temperature Tg of the resulting combination of elastomers is within an acceptable range for use in a tire tread. Such a Tg may be obtained by utilizing a combination of additional elastomers to have Tg in a range of from about -10° C. to about -50° C.

The vulcanizable rubber composition may include from about 50 to about 100 phr of silica.

The commonly-employed siliceous pigments which may be used in the rubber compound include conventional pyrogenic and precipitated siliceous pigments (silica), although precipitated silicas are preferred. The conventional siliceous pigments preferably employed in this invention are precipitated silicas such as, for example, those obtained by the acidification of a soluble silicate, e.g., sodium silicate.

Such conventional silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society,* Volume 60, Page 304 (1930).

The conventional silica may also be typically characterized by having a dibutylphthalate (DBP) absorption value in a range of about 100 to about 400, and more usually about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, etc; silicas available from Rhodia, with, for example, designations of Z1165MP and Z165GR and silicas available from Degussa AG with, for example, designations VN2 and VN3, etc.

The vulcanizable rubber composition may include from about 40 to about 80 phr of carbon black.

Commonly-employed carbon blacks can be used as a conventional filler. Representative examples of such carbon blacks include N110, N121, N220, N231, N234, N242, N293, N299, S315, N326, N330, M332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and DBP number ranging from 34 to 150 cm³/100 g.

The vulcanizable rubber composition may include both silica and carbon black in a combined concentration of from about 20 to about 100 phr, in any weight ratio of silica to carbon black.

Other fillers may be used in the rubber composition including, but not limited to, particulate fillers including ultra high molecular weight polyethylene (UHMWPE), particulate polymer gels such as those disclosed in U.S. Pat. Nos. 6,242,534; 6,207,757; 6,133,364; 6,372,857; 5,395,891; or 6,127,488, and plasticized starch composite filler such as that disclosed in U.S. Pat. No. 5,672,639.

It may be preferred to have the rubber composition for use in the tire component to additionally contain a conventional sulfur containing organosilicon compound. Examples of suitable sulfur containing organosilicon compounds are of the formula:

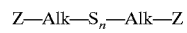

in which Z is selected from the group consisting of

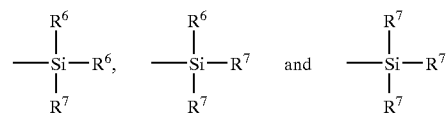

where $R^6$ is an alkyl group of 1 to 4 carbon atoms, cyclohexyl or phenyl; $R^7$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

Specific examples of sulfur containing organosilicon compounds which may be used in accordance with the present invention include: 3,3'-bis(trimethoxysilylpropyl) disulfide, 3,3'-bis (triethoxysilylpropyl) disulfide, 3,3'-bis(triethoxysilylpropyl) tetrasulfide, 3,3'-bis(triethoxysilylpropyl) octasulfide, 3,3'-bis(trimethoxysilylpropyl) tetrasulfide, 2,2'-bis(triethoxysilylethyl) tetrasulfide, 3,3'-bis(trimethoxysilylpropyl) trisulfide, 3,3'-bis(triethoxysilylpropyl) trisulfide, 3,3'-bis(tributoxysilylpropyl) disulfide, 3,3'-bis(trimethoxysilylpropyl) hexasulfide, 3,3'-bis(trimethoxysilylpropyl) octasulfide, 3,3'-bis(trioctoxysilylpropyl) tetrasulfide, 3,3'-bis(trihexoxysilylpropyl) disulfide, 3,3'-bis(tri-2"-ethylhexoxysilylpropyl) trisulfide, 3,3'-bis(triisooctoxysilylpropyl) tetrasulfide, 3,3'-bis(tri-t-butoxysilylpropyl) disulfide, 2,2'-bis(methoxy diethoxy silyl ethyl) tetrasulfide, 2,2'-bis(tripropoxysilylethyl) pentasulfide, 3,3'-bis(tricyclonexoxysilylpropyl) tetrasulfide, 3,3'-bis(tricyclopentoxysilylpropyl) trisulfide, 2,2'-bis(tri-2"-methylcyclohexoxysilylethyl) tetrasulfide, bis (trimethoxysilylmethyl) tetrasulfide, 3-methoxy ethoxy propoxysilyl 3'-diethoxybutoxy-silylpropyltetrasulfide, 2,2'-bis (dimethyl methoxysilylethyl) disulfide, 2,2'-bis(dimethyl sec.butoxysilylethyl) trisulfide, 3,3'-bis(methyl butylethoxysilylpropyl) tetrasulfide, 3,3'-bis(di t-butylmethoxysilylpropyl) tetrasulfide, 2,2'-bis(phenyl methyl methoxysilylethyl) trisulfide, 3,3'-bis(diphenyl isopropoxysilylpropyl) tetrasulfide, 3,3'-bis(diphenyl cyclohexoxysilylpropyl) disulfide, 3,3'-bis(dimethyl ethylmercaptosilylpropyl) tetrasulfide, 2,2'-bis(methyl dimethoxysilylethyl) trisulfide, 2,2'-bis(methyl ethoxypropoxysilylethyl) tetrasulfide, 3,3'-bis(diethyl methoxysilylpropyl) tetrasulfide, 3,3'-bis(ethyl di-sec. butoxysilylpropyl) disulfide, 3,3'-bis(propyl diethoxysilylpropyl) disulfide, 3,3'-bis(butyl dimethoxysilylpropyl) trisulfide, 3,3'-bis(phenyl dimethoxysilylpropyl) tetrasulfide, 3-phenyl ethoxybutoxysilyl 3'-trimethoxysilylpropyl tetrasulfide, 4,4'-bis (trimethoxysilylbutyl) tetrasulfide, 6,6'-bis (triethoxysilylhexyl) tetrasulfide, 12,12'-bis (triisopropoxysilyl dodecyl) disulfide, 18,18'-bis (trimethoxysilyloctadecyl) tetrasulfide, 18,18'-bis (tripropoxysilyloctadecenyl) tetrasulfide, 4,4'-bis (trimethoxysilyl-buten-2-yl) tetrasulfide, 4,4'-bis (trimethoxysilylcyclohexylene) tetrasulfide, 5,5'-bis (dimethoxymethylsilylpentyl) trisulfide, 3,3'-bis (trimethoxysilyl-2-methylpropyl) tetrasulfide, 3,3'-bis (dimethoxyphenylsilyl-2-methylpropyl) disulfide.

The preferred sulfur containing organosilicon compounds are the 3,3'-bis(trimethoxy or triethoxy silylpropyl) sulfides. The most preferred compounds are 3,3'-bis (triethoxysilylpropyl) disulfide and 3,3'-bis (triethoxysilylpropyl) tetrasulfide. Therefore as to formula I, preferably Z is

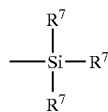

where $R^7$ is an alkoxy of 2 to 4 carbon atoms, with 2 carbon atoms being particularly preferred; alk is a divalent hydrocarbon of 2 to 4 carbon atoms with 3 carbon atoms being particularly preferred; and n is an integer of from 2 to 5 with 2 and 4 being particularly preferred.

The amount of the sulfur containing organosilicon compound of formula I in a rubber composition will vary depending on the level of other additives that are used. Generally speaking, the amount of the compound of formula I will range from 0.5 to 20 phr. Preferably, the amount will range from 1 to 10 phr.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. Preferably, the sulfur-vulcanizing agent is elemental sulfur. The sulfur-vulcanizing agent may be used in an amount ranging from 0.5 to 8 phr, with a range of from 1.5 to 6 phr being preferred. Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, naphthenic, and/or paraffinic processing oils. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, preferably about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The mixing of the rubber composition can be accomplished by methods known to those having skill in the rubber mixing art. For example the ingredients are typically mixed in at least two stages, namely, at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage (s). The terms "non-productive" and "productive" mix stages are well known to those having skill in the rubber mixing art. The rubber composition may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions, and the volume and nature of the components. For example, the thermomechanical working may be from 1 to 20 minutes.

The rubber composition may be incorporated in a variety of rubber components of the tire. For example, the rubber component may be a tread (including tread cap and tread base), sidewall, apex, chafer, sidewall insert, wirecoat or innerliner. Preferably, the compound is a tread.

The pneumatic tire of the present invention may be a race tire, passenger tire, aircraft tire, agricultural, earthmover, off-the-road, truck tire and the like. Preferably, the tire is a passenger or truck tire. The tire may also be a radial or bias, with a radial being preferred.

Vulcanization of the pneumatic tire of the present invention is generally carried out at conventional temperatures ranging from about 100° C. to 200° C. Preferably, the vulcanization is conducted at temperatures ranging from about 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

In one embodiment, the tire is a radial medium truck (RMT) tire. In practice, it is preferred that the sulfur-vulcanized rubber composition for a RMT tire tread has a beneficial balance of physical properties. Such balance of physical properties can be readily by one having skill in such rubber compounding art with routine experimentation by adjustment of sulfur and vulcanization accelerator contents and suitable vulcanization times and temperatures without undue experimentation.

In one embodiment, the RMT tire has a tread component comprising a vulcanizable rubber composition comprising, based on 100 parts by weight of elastomer (phr), from about 5 to about 30 phr of high trans random SBR; from about 70 to about 95 phr of a combination of high cis-1,4-polybutadiene rubber (BR) and cis 1,4-polyisoprene natural rubber (IR) in a IR/BR weight ratio of from about 1 to about 3; from about 20 to about 40 phr of carbon black; and from about 15 to about 35 phr of precipitated silica.

In another embodiment, the RMT tire has a tread component comprising a rubber composition comprising from about 15 to about 25 phr of high trans random SBR comprising from about 5 to about 10 percent by weight of styrene, and from about 75 to about 85 phr of the combination of BR and IR. In another embodiment, the RMT tire has a tread component with a rubber composition comprising a high trans random SBR comprising from about 5 to about 10 percent by weight of styrene.

Fillers may be used in the RMT tire tread component, as have been described herein. In one embodiment, suitable carbon black has an Iodine vale (ASTM D1510) in a range of from about 110 to about 130 mg/g and a dibutyl phthalate (DBP) value (ASTM D2414) in a range of from about 120 to about 140 ml/100 g. In another embodiment, suitable precipitated silica has a nitrogen surface area value (BET) in a range of about 140 to about 180 m2/g. In one embodiment, the RMT tire component may comprise from about 25 to about 35 phr of carbon black. In another embodiment, the RMT tire component may comprise from about 20 to about 30 phr of silica. In another embodiment, the RMT tire component may comprise silica and carbon black in a combined concentration of from about 20 to about 100 phr.

In particular, it is preferred that the sulfur-vulcanized rubber composition in a RMT tire tread has a suitable stiffness as evidenced by a Shore A hardness (23° C.), (see ASTM D2240), in a range of about 65 to about 75, and a G' loss modulus in a range of about 1.8 to about 2.4 MPa. The G' modulus can be readily be determined by a Metravib instrument, Model No. VA3000 at 90° C., 6 percent strain and 7.8 hertz (test method is understood to be similar to ISO 4664 and DIN 53513).

In combination with the rubber composition's stiffness property, it is preferred that the sulfur-vulcanized rubber composition in a RMT tire tread has an abrasion resistance as evidenced by a DIN abrasion value of about 30 to about 50 relative volume loss (mm3) at one Newton force, according to DIN 53516/ASTM D5963.

In combination with the rubber composition's stiffness and abrasion resistance properties, it is preferred that the sulfur-vulcanized rubber composition in a RMT tire tread has a relatively low heat generation property, particularly for the relatively high stiffness value, as indicated by a hot rebound value (100° C.), of about 60 to about 70 percent and a tan delta (90° C.) in a range of about 0.12 to about 0.16. The hot rebound value can be determined by ASTM D1054 and the tan delta value can be determined by a Metravib instrument, Model No. VA3000 at 90° C., 6 percent strain and 7.8 hertz (test method is understood to be similar to ISO 4664 and DIN 53513).

In combination with the rubber composition's stiffness, abrasion resistance and low heat generation properties, it is preferred that the sulfur-vulcanized rubber composition in a RMT has a relatively high damage resistance property, particularly for the relatively high hardness property, as indicated by a relatively high hot tear resistance property (100° C.) of about 20 to about 30 N/mm and a damage resistance index (DRI) in a range of about 14.5 to about 17.5 percent. The hot tear resistance property (tear strength) determination is conducted for peal adhesion of a sample to another sample of the same material. A description may be found in ASTM D4393 except that a sample width of 2.5 cm is used and a clear Mylar plastic film window of a 5 mm width is inserted between the two test samples. It is an interfacial adhesion measurement (pulling force expressed in N/mm units) between two layers of the same tested compound which have been co-cured together with the Mylar film window therebetween. The purpose of the Mylar film window is to delimit the width of the pealed area. The DRI property can be determined by the formula: DRI=(G'/(300 percent modulus))×(100). This property is considered herein to be measure, or indication of the cracking and tear propagation resistance of the compound. In practice, the 300 percent modulus value, (see Ring Modulus ASTM D412), of the sulfur-vulcanized rubber composition may range, for example, from about 12.3 to about 13.5 MPa.

It is considered herein that a significant aspect of the invention is the RMT tread of a rubber composition having an optimized combination of the hardness and abrasion resistance physical properties while maintaining an acceptable heat generation capacity as evidenced by a hot rebound (100° C.) value and a relatively high damage resistance index (DRI) and hot tear resistance.

This is considered herein to be significant because the natural rubber and synthetic rubber blend composition for a RMT tire tread is provided with a significant and beneficially balanced compromise of stiffness, abrasion resistance, heat generation and tear resistance properties.

Significant factors in achieving the beneficial balance of physical properties in an RMT tread is considered herein, in one aspect, to be largely attributable to the natural rubber content of the rubber composition which aids in promoting stiffness, damage resistance and heat durability together with the cis 1,4-polybutadiene rubber and solution polymerization prepared styrene/butadiene rubber and together with the significantly high structure rubber reinforcing carbon black and precipitated silica, together with its coupling agent.

Accordingly, for one aspect of the invention, a RMT tire is provided having a tread of a sulfur-vulcanized rubber composition having a balance of physical properties as:

(1) a Shore A hardness (23° C.) in a range of about 65 to about 71;

(2) a G' value in a range of about 1.8 to about 2.4 MPa;

(3) a DIN abrasion resistance (1 N) (mm3 relative volume loss) in a range of about 30 to about 50;

(4) a rebound value (100° C.) in a range of about 60 to about 68 percent;

(5) a tan delta (90° C.) value in a range of 0.12 through 0.16;

(6) a hot tear resistance value (100° C.) in a range of about 20 to about 30 N/mm, and (7) a damage resistance index (DRI) in a range of about 14.5 to about 17.5 percent.

It is considered herein that a significant aspect of this invention is the above compromised balance, for a RMT tire tread, between stiffness, abrasion resistance, heat generation and damage resistance by use of the natural rubber/synthetic rubber blend and selected rubber reinforcing carbon black and precipitated silica containing rubber composition.

It is considered herein that a significant aspect of this invention insofar as promoting a Shore A hardness value and G' value in the indicated range is the high natural rubber content of the rubber composition in a RMT tire tread composed of three elastomers together with the indicated selective reinforcement loading of carbon black and precipitated silica, with the majority being a high structure carbon black.

It is considered herein that a significant aspect of this invention insofar as promoting a DIN abrasion resistance value, hot tear resistance value and damage resistance index (DRI) is a contribution of relatively high reinforcing filler loading in a RMT tire tread and selection of reinforcing filler types as well the selection of the respective elastomers.

It is considered herein that a significant aspect of this invention insofar as promoting a rebound (100° C.) value and the tan delta (90° C.) value is the relatively high silica reinforcing filler loading if the indicated precipitated silica together with its coupling agent.

The following examples are presented for the purposes of illustrating and not limiting the present invention. All parts are parts by weight unless specifically identified otherwise.

EXAMPLE I

In this example, a high trans random solution SBR (HTSBR) polymer prepared following the teachings of U.S. application Ser. No. 10/124,006, now U.S. Pat. No. 6,627,715, and containing about 8 percent by weight of styrene was compounded and tested for various physical properties.

The polymer was compounded with standard amounts of conventional curatives and processing aids as indicated in Table 1, and cured with a standard cure cycle. Cured samples were evaluated for various physical properties following standard tests protocols as indicated in Table 2.

TABLE 1

Compound Recipe

| | |
|---|---|
| Elastomers | 100 |
| Zinc Oxide | 2.5 |
| Process Oil | 26.5 |
| Stearic Acid | 3 |
| Wax | 1.5 |
| Silica | 75 |
| Sulfur | 1.7 |
| Antidegradants[1] | 3 |
| Accelerators[2] | 3.6 |
| Coupling Agent[3] | 12 |

[1] p-phenylenediamine type
[2] sulfenamide type
[3] 50 percent by weight on carbon black carrier

TABLE 2

| | Sample | |
|---|---|---|
| | 1 | 2 |
| Elastomers | 70 phr JSR T596 SSBR | 68 phr JSR T596 SSBR |
| | 30 phr Budene ® 1207 polybutadiene | 20 phr Budene ® 1207 polybutadiene |
| | | 12 phr HTSBR |
| Tear Strength, N | 14.5 | 17.3 |
| Elongation, % | 387.7 | 430.1 |
| True Tensile, MPa | 87.5 | 97.1 |
| RPA Tan.Delta 10% | 0.083 | 0.095 |
| Rebound 100° C., % | 68.4 | 65.6 |
| Rebound 0° C., % | 8.8 | 8.4 |
| Drum Abrasion (mm$^3$) | 89.7 | 98.5 |
| Shore A | 63.4 | 62.3 |
| Modulus 300%, MPa | 13.7 | 12.0 |
| Modulus Ratio | 6.0 | 5.7 |
| G' (10% sw2) | 1.438 | 1.427 |
| G' (1% sw1) | 1.859 | 1.955 |

SSBR/silica formulations are preferred over ESBR/silica formulations in some applications due to their overall better property balance. One drawback of such formulations relative to ESBR formulations, for example, is their generally poorer tear/elongation properties. These properties are of importance in high performance passenger compounds required to pass heavy handling tests. Unexpectedly and surprisingly, the use of a high trans-SBR added to SSBR/BR/silica blend in 5–30 phr at similar compound Tg achieves a tear improvement of about 20% with no drawback in wet properties as indicated by the 0° C. rebound values.

EXAMPLE 2

Sulfur-curable rubber compositions suitable for use in a RMT tire tread are prepared which are comprised of cis 1,4-polyisoprene natural rubber, cis 1,4-polybutadiene rubber and a high trans random solution SBR (HTSBR) polymer prepared following the teachings of U.S. application Ser. No. 10/124,006, now U.S. Pat. No. 6,627,715, and containing about 8 percent by weight of styrene, as well as high structure carbon black, precipitated silica and coupling agent.

The samples were prepared by mixing the ingredients in an internal rubber mixer in a non-productive (without sulfur and accelerators) mixing step followed by a productive (with sulfur and accelerator addition at a lower mix temperature) mixing step. The rubber compositions were dumped from the rubber mixer after each mixing step, sheeted out from an open mill and allowed to cool to below 40° C. after each mixing step. The ingredients were mixed in the non-productive mixing steps for about 2 minutes to a temperature of about 165° C. The subsequent productive mixing step was conducted for about 2 minutes to a temperature of about 115° C.

Table 3 illustrates the ingredients used for preparing the rubber compositions.

TABLE 3

| | Sample | | | | | |
|---|---|---|---|---|---|---|
| | A | B | C | D | E | F |
| Non-Productive Mixing Step (to 165° C.) | | | | | | |
| Cis 1,4-polyisoprene rubber[1] | 100 | 100 | 100 | 70 | 50 | 50 |
| Cis 1,4-polybutadiene rubber[2] | — | — | — | 30 | 30 | 30 |
| Styrene/butadiene rubber[3] | — | — | — | — | 20 | — |

TABLE 3-continued

|  | Sample | | | | | |
| --- | --- | --- | --- | --- | --- | --- |
|  | A | B | C | D | E | F |
| HTSBR[4] | — | — | — | — | — | 20 |
| High structure carbon black[5] | 55 | 40 | 32 | 32 | 32 | 32 |
| Precipitated silica[6] | — | 15 | 25 | 25 | 25 | 25 |
| Coupling agent[7] | — | 4 | 6.5 | 6.5 | 6.5 | 6.5 |
| Antioxidant[8] | 1.5 | 1.5 | 1.5 | 1.5 | 1.5 | 1.5 |
| Fatty acid[9] | 3 | 3 | 3 | 3 | 3 | 3 |
| Paraffinic processing oil | 2 | 2 | 2 | 2 | 2 | 2 |
| Zinc oxide | 3 | 3 | 3 | 3 | 3 | 3 |
| Productive Mixing Step (to 115° C.) | | | | | | |
| Accelerator(s)[10] | 2 | 2 | 2 | 2 | 2 | 2 |
| Sulfur | 1 | 1 | 1 | 1 | 1 | 1 |

[1]Natural cis 1,4-polyisoprene rubber having a cis 1,4-content of at least 96 percent and a Tg of about −65° C.
[2]Cis 1,4-polybutadiene rubber obtained as Budene ® 1207 from The Goodyear Tire & Rubber Company having a cis 1,4-content of at least 96 percent and a Tg of about −100° C.
[3]Styrene/butadiene copolymer rubber as Plioflex ® 1502NN(tm) from The Goodyear Tire & Rubber Company having a styrene content of about 23.5 percent and a Tg of about −50° C. prepared by aqueous emulsion polymerization of styrene and 1,3-butadiene monomers.
[4]High trans random solution styrene/butadiene copolymer rubber having a styrene content of about 8 percent, a trans 1,4-polybutadiene content of about 70 percent, and a Tg of about −80° C., prepared following the teachings of U.S. application Ser. No. 10/124,006.
[5]N121 carbon black, an ASTM designation.
[6]Zeosil 1165MP from the Rhodia Company having a BET nitrogen surface area within a range of about 140 to about 180 m$^2$/g.
[7]Composite of coupling agent as Si69 as a bis (3-triethoxysilylpropyl) polysulfide containing from an average of about 3.5 to about 4 connecting sulfur atoms in its polysulfidic bridge, which may sometimes be referred to as a tetrasulfide, on carbon carrier in a 50/50 weight ratio, from Degussa-Hulls and reported in the Table on a basis of the composite of coupling agent and carbon black.
[8]Amine-based antidegradant.
[9]Primarily stearic acid which also contains oleic and linoleic acids.
[10]Sulfenamide based accelerator.

The rubber compositions of Table 3 were cured for about 32 minutes at about 150° C. Various resulting physical properties are shown in the following Table 4.

TABLE 4

|  | Sample | | | | | |
| --- | --- | --- | --- | --- | --- | --- |
|  | A | B | C | D | E | F |
| Visco Analyzer (7.8 Hertz, 90° C., 6% strain)[1] | | | | | | |
| G' (MPa) | 2.1 | 1.7 | 1.8 | 1.8 | 2.1 | 2.1 |
| Tan delta | 0.216 | 0.148 | 0.125 | 0.109 | 0.118 | 0.126 |
| Modulus, 300 percent (MPa) | 15.9 | 14.3 | 15.5 | 13.5 | 13.7 | 12.9 |
| Ultimate elongation (percent) | 490 | 470 | 480 | 480 | 480 | 480 |
| DIN abrasion (mm3 loss at 23° C.) | 108 | 120 | 110 | 53 | 50 | 38 |
| Shore A hardness (23° C.) | 71 | 66 | 68 | 66 | 68 | 67 |
| Hot rebound (100° C.) | 58 | 67 | 68 | 70 | 66 | 64 |
| Tear resistance (N/mm) | 35 | 39 | 44 | 29 | 24 | 28 |
| Damage resistance index (DRI) | 13.1 | 12 | 11.8 | 13.2 | 15.2 | 16.3 |

[1]The Visco Analyzer is an analytical instrument used for measuring G' and tan delta values for rubber samples, obtained as Model Number VA3000 from the Metravib Company. For these Samples, the instrument was operated and the data was taken at a frequency of 7.8 Hertz and a 6 percent strain for the sample, at a temperature of 90° C.

From Table 2, it can be seen that cis 1,4-polyisoprene natural-rich Samples were prepared with a high structure carbon black as N121 and a precipitated silica, with a coupling agent. Samples D, E & F also contained cis 1,4-polybutadiene rubber and a high trans random solution SBR (HTSBR) polymer. The elastomers selection and amounts and the reinforcing fillers selection and amounts for Sample F is considered herein to be important for promoting a beneficial compromise of physical properties of the sulfur vulcanized Sample F, namely the stiffness (G' and Shore A hardness), abrasion resistance, heat generation (Hot rebound and tan delta), and damage resistance (tear resistance and DRI) values.

From Table 4, it can be seen that fillers selection and amounts of sample C compared to sample A help to promote:

(A) a low heat generation measured by Tan delta and Hot Rebound; and (B) a high tear resistance.

From Table 2, it can be seen that polymers selection and amounts of sample F compared to sample C help to promote:

(A) a high dynamic stiffness measured by G';

(B) a high wear resistance measured by DIN abrasion; and (C) a high damage resistance measured by the Damage Resistance index DRI.

From Table 4, it can be seen that use of HTSBR in sample F compared to Styrene/butadiene copolymer rubber as Plioflex 1502NN(tm) used in sample E help to promote:

(A) a high wear resistance measured by DIN abrasion; and (B) a high damage resistance measured by the Tear resistance and the Damage Resistance index DRI Overall, polymers and fillers selection and amounts of sample F lead to:

(A) a relatively high level of stiffness (Shore A hardness of 67 and G' of 2.1 MPa);

(B) a very good DIN abrasion resistance (38 mm3 loss);

(C) a satisfactory damage resistance (tear resistance of 28 and DRI of 16.3); and (D) a relatively low heat generation (hot rebound of 64 and tan delta at 90° C. of 0.126).

This is considered to be significant because it is considered herein that such compromise of physical properties (the beneficial properties in combination with substantially maintaining the aforesaid heat generation properties) for a tire tread rubber composition will aid in providing a tread of a combined treadwear resistance, chip and chunking resistance and tire handling performance without significantly negatively affecting the tire tread rubber durability, namely heat durability.

While certain representative embodiments and details have been shown for the purpose of illustrating the subject invention, it will be apparent to those skilled in this art that various changes and modifications can be made therein without departing from the scope of the subject invention.

What is claimed is:

1. A radial medium truck tire having a tread component comprising a vulcanizable rubber composition comprising, based on 100 parts by weight of elastomer (phr),
   (A) from about 5 to about 30 phr of high trans random SBR having a trans 1,4 butadiene content in the polybutadiene segments of the SBR of greater than 60 percent by weight, wherein said high trans random SBR is produced by a process that comprises copolymerizing styrene and 1,3-butadiene in an organic solvent in the presence of a catalyst system that is comprised of
      (i) an organolithium compound,
      (ii) a group IIa metal salt selected from the group consisting of group IIa metal salts of amino glycols and group IIa metal salts of glycol ethers, and
      (iii) an organometallic compound selected from the group consisting of organoaluminum compounds and organomagnesium compounds;
   (B) from about 70 to about 95 phr of a combination of high cis-1,4-polybutadiene rubber (BR) and cis 1,4-polyisoprene natural rubber (IR) in a IR/BR weight ratio of from about 1 to about 3;
   (C) from about 20 to about 40 phr of carbon black; and
   (D) from about 15 to about 35 phr of precipitated silica.

2. The tire of claim 1, wherein said vulcanizable rubber composition comprises from about 15 to about 25 phr of high trans random SBR comprising from about 5 to about 10 percent by weight of styrene, and from about 75 to about 85 phr of the combination of BR and IR.

3. The tire of claim 1, wherein said high trans random SBR comprises from about 5 to about 10 percent by weight of styrene.

4. The tire of claim 1, wherein said tread component has
   (1) a Shore A hardness (23° C.) in a range of about 65 to about 71;
   (2) a G' value in a range of about 1.8 to about 2.4 MPa;
   (3) a DIN abrasion resistance (1 N) (mm3 relative volume loss) in a range of about 30 to about 50;
   (4) a rebound value (100° C.) in a range of about 60 to about 68 percent;
   (5) a tan delta (90° C.) value in a range of 0.12 through 0.16;
   (6) a hot tear resistance value (100° C.) in a range of about 20 to about 30 N/mm; and
   (7) a damage resistance index (DRI) in a range of about 14.5 to about 17.5 percent.

5. The tire of claim 1, wherein said high trans random SBR has a trans content of greater than 70 percent by weight.

6. The tire of claim 1, wherein said high trans random SBR has a glass transition temperature in a range of from about −70° C. to about −90° C.

7. The tire of claim 1, wherein said component is a tread cap or tread base.

8. The tire of claim 1, wherein said carbon black has an Iodine vale (ASTM D1510) in a range of from about 110 to about 130 mg/g and a dibutyl phthalate (DBP) value (ASTM D2414) in a range of from about 120 to about 140 ml/100 g.

9. The tire of claim 1, wherein said precipitated silica has a nitrogen surface area value (BET) in a range of about 140 to about 180 m$^2$/g.

10. The tire of claim 1, wherein said IR has a cis 1,4 content of at least 96 percent and a Tg in a range of from about −60° C. to about −70° C.

11. The tire of claim 1, wherein said BR has a cis 1,4 content of at least 96 percent and a Tg in a range of from about −90° C. to about −110° C.

12. The tire of claim 1, wherein said vulcanizable rubber composition further comprises from about 25 to about 35 phr of carbon black.

13. The tire of claim 1, wherein said vulcanizable rubber composition comprises from about 20 to about 30 phr of silica.

14. The tire of claim 1, wherein said vulcanizable rubber composition comprises silica and carbon black in a combined concentration of from about 20 to about 100 phr.

15. The tire of claim 1, wherein less than 10 percent of the total quantity of repeat units derived from styrene in said high trans random SBR are in blocks containing more than five styrene repeat units.

16. The tire of claim 1, wherein less than 4 percent of the total quantity of repeat units derived from styrene in said high trans random SBR are in blocks containing 5 or more styrene repeat units.

17. The tire of claim 1, wherein said high trans random SBR is produced by a process that comprises polymerizing styrene and 1,3-butadiene in an organic solvent at a temperature that is within the range of about 40° C. to about 120° C. in the presence of a catalyst system that is comprised of (a) an organo lithium compound, (b) a group IIa metal salt of an amino glycol, and (c) an organometallic compound selected from the group consisting of organoaluminum compounds containing less than 13 carbon atoms and organomagnesium compounds.

* * * * *